(12) United States Patent
Sokolov et al.

(10) Patent No.: US 10,445,481 B1
(45) Date of Patent: Oct. 15, 2019

(54) SYSTEMS AND METHODS FOR PERFORMING HUMAN-VERIFICATION PROCEDURES

(71) Applicant: Symantec Corporation, Mountain View, CA (US)

(72) Inventors: Ilya Sokolov, Boston, MA (US); Keith Newstadt, West Newton, MA (US)

(73) Assignee: Symantec Corporation, Mountain View, CA (US)

( * ) Notice: Subject to any disclaimer, the term of this patent is extended or adjusted under 35 U.S.C. 154(b) by 149 days.

(21) Appl. No.: 15/065,924

(22) Filed: Mar. 10, 2016

(51) Int. Cl.
  *G06F 21/32* (2013.01)
  *G06F 21/57* (2013.01)
  *G06F 21/62* (2013.01)

(52) U.S. Cl.
  CPC ............ *G06F 21/32* (2013.01); *G06F 21/577* (2013.01); *G06F 21/6218* (2013.01); *G06F 2221/034* (2013.01)

(58) Field of Classification Search
  None
  See application file for complete search history.

(56) References Cited

U.S. PATENT DOCUMENTS

| | | | | |
|---|---|---|---|---|
| 9,032,510 | B2* | 5/2015 | Sampathkumaran | ........................ H04L 9/3231 382/103 |
| 9,081,947 | B2* | 7/2015 | Dewan | ................ G06K 9/00288 |
| 9,503,786 | B2* | 11/2016 | el Kaliouby | ............ A61B 5/165 |
| 2011/0035505 | A1* | 2/2011 | Jakobsson | ................ H04L 63/10 709/229 |
| 2012/0246737 | A1* | 9/2012 | Paxton | .................. G06F 21/316 726/27 |
| 2013/0162524 | A1* | 6/2013 | Li | ............................ G06K 9/00 345/156 |
| 2013/0300900 | A1* | 11/2013 | Pfister | ................ G06K 9/00315 348/239 |
| 2015/0110471 | A1* | 4/2015 | Zheng | ...................... H04N 5/76 386/291 |

(Continued)

OTHER PUBLICATIONS

"ReCAPTCHA", https://www.google.com/recaptcha/intro/index.html, as accessed Jan. 13, 2016, Google, (Apr. 17, 2014).

(Continued)

*Primary Examiner* — Fatoumata Traore
(74) *Attorney, Agent, or Firm* — FisherBroyles, LLP (57) ABSTRACT

The disclosed computer-implemented method for performing human-verification procedures may include (1) detecting, at a computing device, an attempt to access a computing resource that is to be protected from being accessed by automated bots, (2) in response to detecting the attempt to access the computing resource, presenting, on the computing device, an audiovisual display that is configured to produce at least one expected reaction from human users, the expected reaction being characterized by an expected facial expression, (3) while the audiovisual display is being presented, monitoring facial expressions of any user that is currently using the computing device, and (4) determining whether the attempt to access the computing resource was performed by a human user or an automated bot based at least in part on a comparison between the monitored facial expressions and the expected facial expression. Various other methods, systems, and computer-readable media are also disclosed.

20 Claims, 5 Drawing Sheets

(56) References Cited

U.S. PATENT DOCUMENTS

2016/0342851 A1* 11/2016 Holz .................. G06K 9/00906
2017/0180348 A1*  6/2017 Piccolotto .......... G06K 9/00906

OTHER PUBLICATIONS

"Are you a human", http://demo.areyouahuman.com/, as accessed Jan. 13, 2016, (on or before Jan. 13, 2016).
"CaptchaFace", https://web.archive.org/web/20160306031954/http://captchaface.com/, as accessed Jan. 13, 2016, (on or before Jan. 13, 2016).
Scott, Katie, "Computer trained to detect micro-expressions better than humans", http://www.wired.co.uk/article/computer-trained-to-read-micro-expressions, as accessed Jan. 13, 2016, Wired, (Nov. 23, 2011).
"Emotcha", http://devpost.com/software/emotcha, as accessed Jan. 13, 2016, (Aug. 11, 2015).
"Microexpression", https://en.wikipedia.org/wiki/Microexpression, as accessed Jan. 13, 2016, Wikipedia, (Jan. 27, 2005).
"Micro Expressions Training Tools", https://www.paulekman.com/micro-expressions-training-tools/, as accessed Jan. 13, 2016, The Ekman Library, (on or before Jan. 13, 2016).
"Denial-of-service attack", https://en.wikipedia.org/wiki/Denial-of-service_attack, as accessed Jan. 13, 2016, Wikipedia, (Jul. 22, 2004).

* cited by examiner

SYSTEMS AND METHODS FOR PERFORMING HUMAN-VERIFICATION PROCEDURES

BACKGROUND

Online platforms and cloud-based services may allow users to quickly and easily perform a variety of tasks and activities, such as shopping, managing financial accounts, and performing legal actions. Unfortunately, attackers may take advantage of these services by generating automated bots that mimic the interactions between human users and the services. Such bots may illegitimately access users' personal information (e.g., by brute-force guessing passwords to users' accounts) and/or prevent users from accessing online resources (e.g., by carrying out Denial-of-Service (DoS) attacks).

Traditional methods for detecting and preventing illegitimate bots may involve prompting users to complete human-verification procedures before they are permitted to access certain online resources. Such verification procedures may include asking users to enter abstracted text shown on an image (e.g., a CAPTCHA) or complete other logical or interactive tasks. However, the tasks required for conventional verification procedures may be tedious and/or difficult for many users (e.g., users who do not fluently speak the language in which the tasks are written). Furthermore, attackers may be able to design automated bots that can trick or circumvent such tasks. The instant disclosure, therefore, describes improved systems and methods for performing human-verification procedures.

SUMMARY

As will be described in greater detail below, the instant disclosure describes various systems and methods for performing human-verification procedures by displaying, in response to detecting an attempt to access a computing resource, an audiovisual display designed to produce certain expected facial expressions from human users. The disclosed systems and methods may then compare facial expressions exhibited by any user that is viewing the audiovisual display with the expected facial expressions to determine whether the attempt to access the computing resource was performed by a human user or an automated bot.

In one example, a computer-implemented method for performing such a task may include (1) detecting, at a computing device, an attempt to access a computing resource that is to be protected from being accessed by automated bots, (2) in response to detecting the attempt to access the computing resource, presenting, on the computing device, an audiovisual display that is configured to produce at least one expected reaction from human users, the expected reaction being characterized by an expected facial expression, (3) while the audiovisual display is being presented, monitoring facial expressions of any user that is currently using the computing device, and (4) determining whether the attempt to access the computing resource was performed by a human user or an automated bot based at least in part on a comparison between the monitored facial expressions and the expected facial expression.

In some examples, the computing resource may include a user account, a database that stores sensitive information, and/or an online platform capable of facilitating financial transactions. In some embodiments, the audiovisual display may include a series of images and/or a video clip. Furthermore, in some examples, the expected reaction may include a series of human emotions. In these examples, the expected facial expression may include or a series of microexpressions that represent brief, involuntary reactions to the series of human emotions.

In some embodiments, the method may include identifying the expected facial expression prior to presenting the audiovisual display on the computing device. Specifically, the method may include recording facial expressions of a group of test users while the audiovisual display is being presented to the group of test users and then compiling the facial expressions of the group of test users into a facial expression representative of a typical user.

In some examples, monitoring the facial expressions of any user that is currently using the computing device may include triggering a webcam built into the computing device to record activity occurring around the computing device.

In some embodiments, the method may include determining that the attempt to access the computing resource was performed by the automated bot based on determining that the monitored facial expressions do not match the expected facial expression. In such embodiments, the method may then include presenting an additional human-verification procedure on the computing device and/or preventing the computing device from accessing the computing resource.

In other embodiments, the method may include determining that the attempt to access the computing resource was performed by the human user based on determining that the monitored facial expressions match the expected facial expression. In these embodiments, the method may then include allowing the computing device to access the computing resource.

In one embodiment, a system for implementing the above-described method may include (1) a detection module that detects, at a computing device, an attempt to access a computing resource that is to be protected from being accessed by automated bots, (2) a display module that presents, on the computing device in response to detecting the attempt to access the computing resource, an audiovisual display that is configured to produce at least one expected reaction from human users, the expected reaction being characterized by an expected facial expression, (3) a monitoring module that monitors, while the audiovisual display is being presented, facial expressions of any user that is currently using the computing device, and (4) a determination module that determines whether the attempt to access the computing resource was performed by a human user or an automated bot based at least in part on a comparison between the monitored facial expressions and the expected facial expression. In addition, the system may include at least one hardware processor configured to execute the detection module, the display module, the monitoring module, and the determination module.

In some examples, the above-described method may be encoded as computer-readable instructions on a non-transitory computer-readable medium. For example, a computer-readable medium may include one or more computer-executable instructions that, when executed by at least one processor of a computing device, may cause the computing device to (1) detect, at the computing device, an attempt to access a computing resource that is to be protected from being accessed by automated bots, (2) in response to detecting the attempt to access the computing resource, present, on the computing device, an audiovisual display that is configured to produce at least one expected reaction from human users, the expected reaction being characterized by an expected facial expression, (3) while the audiovisual display is being presented, monitor facial expressions of any user that is currently using the computing device, and (4) determine whether the attempt to access the computing resource was performed by a human user or an automated bot based at least in part on a comparison between the monitored facial expressions and the expected facial expression.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The present disclosure is generally directed to systems and methods for performing human-verification procedures. As will be explained in greater detail below, by analyzing the reactions of users to audiovisual displays designed to produce certain human emotions and facial expressions, the disclosed systems and methods may accurately and efficiently differentiate between malicious automated bots and legitimate human users. As such, the systems and methods described herein may provide sophisticated human-verification solutions for computing resources (e.g., websites, user accounts, and other online services) that wish to protect their content from automated bots. In addition, unlike traditional human-verification solutions (e.g., CAPTCHAs), the disclosed systems and methods may not be deceived by automated bots that attempt to mimic human behaviors.

Figure 1:
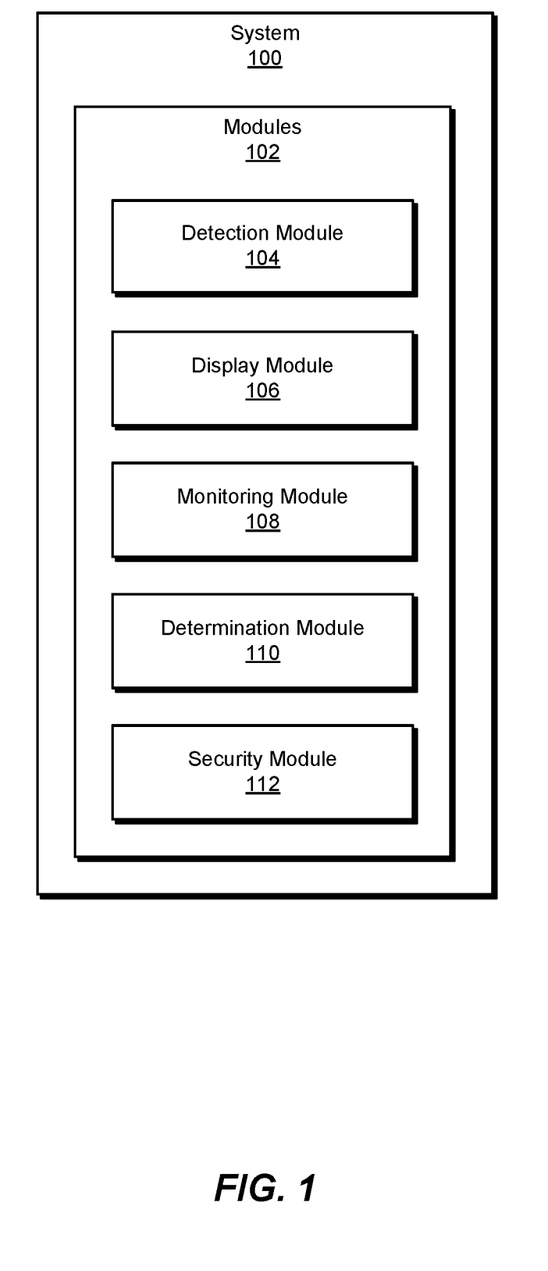
FIG. 1 is a block diagram of an exemplary system for performing human-verification procedures.
Figure 2:
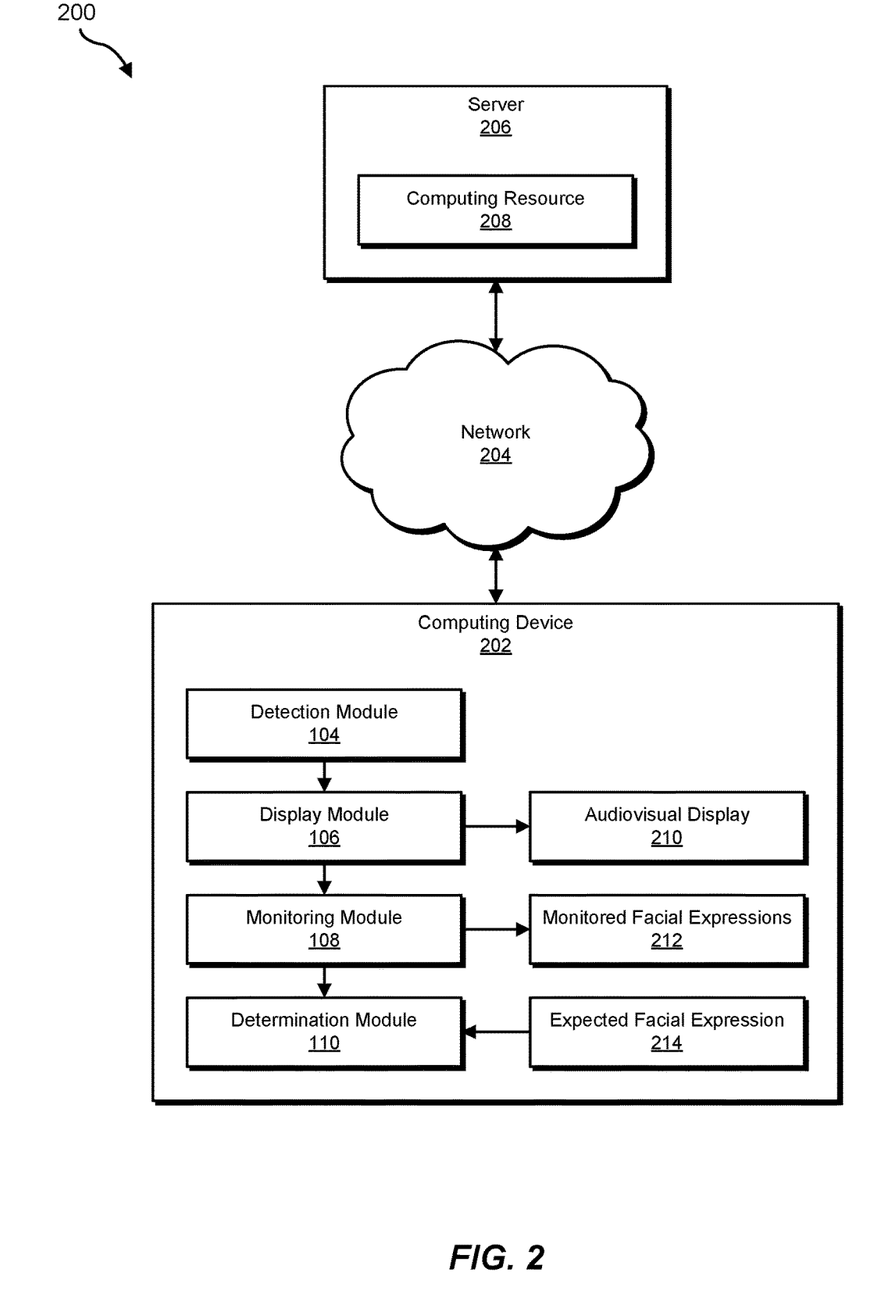
FIG. 2 is a block diagram of an additional exemplary system for performing human-verification procedures.

The following will provide, with reference to FIGS. 1 and 2, detailed descriptions of exemplary systems for performing human-verification procedures. Detailed descriptions of corresponding computer-implemented methods will also be provided in connection with FIG. 3. In addition, detailed descriptions of an exemplary computing system and network architecture capable of implementing one or more of the embodiments described herein will be provided in connection with FIGS. 4 and 5, respectively.

FIG. 1 is a block diagram of an exemplary system 100 for performing human-verification procedures. As illustrated in this figure, exemplary system 100 may include one or more modules 102 for performing one or more tasks. For example, and as will be explained in greater detail below, exemplary system 100 may include a detection module 104 that detects, at a computing device, an attempt to access a computing resource that is to be protected from being accessed by automated bots. Exemplary system 100 may also include a display module 106 that presents, on the computing device in response to detecting the attempt to access the computing resource, an audiovisual display that is configured to produce at least one expected reaction from human users, the expected reaction being characterized by an expected facial expression.

In addition, and as will be described in greater detail below, exemplary system 100 may include a monitoring module 108 that monitors, while the audiovisual display is being presented, facial expressions of any user that is currently using the computing device. Exemplary system 100 may also include a determination module 110 that determines whether the attempt to access the computing resource was performed by a human user or an automated bot based at least in part on a comparison between the monitored facial expressions and the expected facial expression. Finally, exemplary system 100 may include a security module 112 that performs one or more security actions based on the determination of whether the attempt to access the computing resource was performed by the human user or the automated bot. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent software modules stored and configured to run on one or more computing devices, such as the devices illustrated in FIG. 2 (e.g., computing device 202 and/or server 206), computing system 410 in FIG. 4, and/or portions of exemplary network architecture 500 in FIG. 5. One or more of modules 102 in FIG. 1 may also represent all or portions of one or more special-purpose computers configured to perform one or more tasks.

Exemplary system 100 in FIG. 1 may be implemented in a variety of ways. For example, all or a portion of exemplary system 100 may represent portions of exemplary system 200 in FIG. 2. As shown in FIG. 2, system 200 may include a computing device 202 in communication with a server 206 via a network 204. In this example, computing device 202 may be programmed with one or more of modules 102 in order to prevent automated bots operating on computing device 202 from accessing computing resources hosted on server 206 (e.g., computing resource 208). Additionally or alternatively, one or more of modules 102 may be hosted server-side on server 206. In these examples, modules 102 on server 206 may interact with computing device 202 (and any entity that may currently be using computing device 202) via a browser or webpage running on computing device 202.

In one embodiment, one or more of modules 102 from FIG. 1 may, when executed by at least one processor of computing device 202 and/or server 206, enable computing device 202 and/or server 206 to perform human-verification procedures. For example, and as will be described in greater detail below, detection module 104 may cause computing device 202 and/or server 206 to detect, at computing device 202, an attempt to access computing resource 208 that is to be protected from being accessed by automated bots. In response to detecting the attempt to access computing resource 208, display module 106 may cause computing device 202 and/or server 206 to present an audiovisual display 210 on computing device 202. Audiovisual display 210 may be configured to produce at least one expected reaction from human users that is characterized by an expected facial expression 214. While audiovisual display 210 is being presented, monitoring module 108 may cause computing device 202 and/or server 206 to monitor facial expressions of any user that is currently using computing device 202 (generating monitored facial expressions 212). Finally, determination module 110 may cause computing device 202 and/or server 206 to determine whether the attempt to access computing resource 208 was performed by a human user or an automated bot based at least in part on a comparison between monitored facial expressions 212 and expected facial expression 214.

Computing device 202 generally represents any type or form of computing device capable of reading computer-executable instructions. Examples of computing device 202 include, without limitation, laptops, tablets, desktops, servers, cellular phones, Personal Digital Assistants (PDAs), multimedia players, embedded systems, wearable devices (e.g., smart watches, smart glasses, etc.), gaming consoles, combinations of one or more of the same, exemplary computing system 410 in FIG. 4, or any other suitable computing device.

Server 206 generally represents any type or form of computing device that is capable of hosting a computing resource and/or analyzing or storing reactions of human users to audiovisual displays. Examples of server 206 include, without limitation, application servers and database servers configured to provide various database services and/or run certain software applications.

Network 204 generally represents any medium or architecture capable of facilitating communication or data transfer. Examples of network 204 include, without limitation, an intranet, a Wide Area Network (WAN), a Local Area Network (LAN), a Personal Area Network (PAN), the Internet, Power Line Communications (PLC), a cellular network (e.g., a Global System for Mobile Communications (GSM) network), exemplary network architecture 500 in FIG. 5, or the like. Network 204 may facilitate communication or data transfer using wireless or wired connections. In one embodiment, network 204 may facilitate communication between computing device 202 and server 206.

Figure 3:
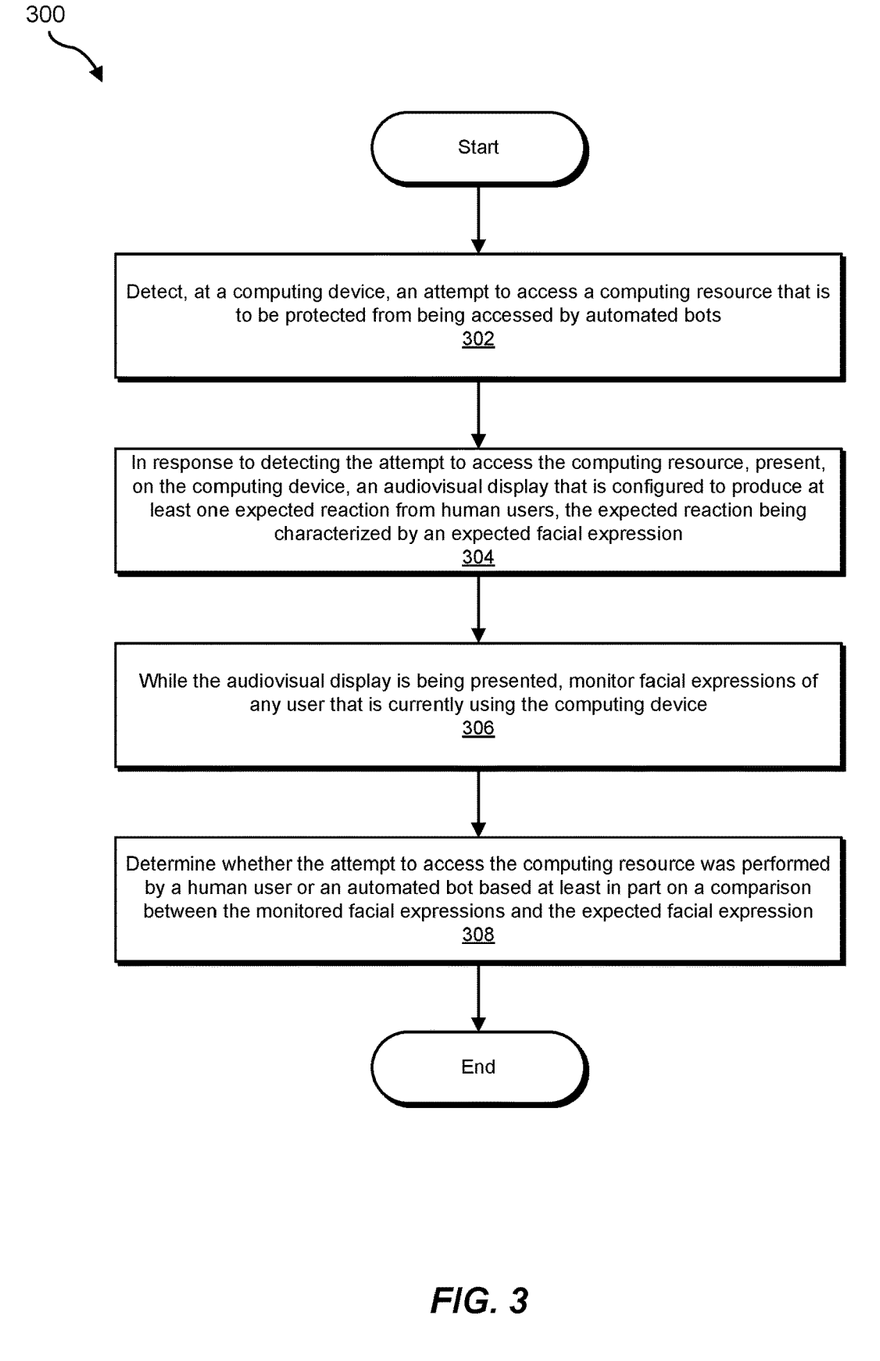
FIG. 3 is a flow diagram of an exemplary method for performing human-verification procedures.

FIG. 3 is a flow diagram of an exemplary computer-implemented method 300 for performing human-verification procedures. The steps shown in FIG. 3 may be performed by any suitable computer-executable code and/or computing system. In some embodiments, the steps shown in FIG. 3 may be performed by one or more of the components of system 100 in FIG. 1, system 200 in FIG. 2, computing system 410 in FIG. 4, and/or portions of exemplary network architecture 500 in FIG. 5.

As illustrated in FIG. 3, at step 302 one or more of the systems described herein may detect, at a computing device, an attempt to access a computing resource that is to be protected from being accessed by automated bots. For example, detection module 104 may, as part of computing device 202 in FIG. 2, detect, at computing device 202, an attempt to access computing resource 208.

The term "computing resource," as used herein, generally refers to any type or form of service, platform, or data accessible via a computing device and/or the internet. Examples of computing resources include, without limitation, software resources (e.g., applications, programs, or databases), hardware resources (e.g., computing devices, servers, or individual hardware components), and network resources (e.g., online services, user accounts, portals, websites, or portions of websites). In exemplary embodiments, the systems described herein may be tasked to prevent automated bots from accessing sensitive and/or vulnerable computing resources, such as online platforms capable of facilitating financial transactions (e.g., online banking or online shopping services).

As will be explained in greater detail below, the systems described herein may protect such computing resources by requiring the completion of a human-verification procedure before access to the computing resources is permitted. The term "human-verification procedure," as used herein, generally refers to any type or form of task, test, or process used to determine whether a computing device is being controlled by a human user or an automated bot. The term "automated bot," as used herein, generally refers to any type or form of script, executable code, or program that mimics one or more behaviors of a human user. In some examples, attackers may deploy automated bots to gain access to sensitive information (e.g., by brute-force guessing the passwords to user accounts) and/or to render a machine or network resource unavailable to intended users (e.g., as part of a DoS attack).

Detection module 104 may detect an attempt to access a computing resource that is to be protected from being accessed by automated bots in a variety of ways. In some examples, detection module 104 may detect any type or form of input (e.g., mouse click, keyboard input, voice command, etc.) involved in opening, viewing, logging into, and/or connecting to a protected computing resource. Additionally or alternatively, detection module 104 may determine that a computing device has opened, rendered, or otherwise accessed a platform (e.g., webpage) that is capable of providing access to a computing resource. As an example, detection module 104 may detect an attempt to access a protected user account by determining that an entity controlling a computing device has accessed a login page that may be used to access the user account and entered login credentials into a user interface of the login page.

Notably, detection module 104 may detect an attempt on a computing device to access a protected computing resource before the attempt is completed (i.e., before an entity controlling the computing device has successfully accessed the computing resource). As such, the systems described herein may block the attempt to access the protected computing resource until verifying that the attempt was performed by a human user.

Returning to FIG. 3, at step 304 one or more of the systems described herein may present, on the computing device in response to detecting the attempt to access the computing resource, an audiovisual display that is configured to produce at least one expected reaction from human users, the expected reaction being characterized by an expected facial expression. For example, display module 106 may, as part of computing device 202 in FIG. 2, present, on computing device 202, audiovisual display 210 that is configured to produce an expected reaction from human users, the expected reaction being characterized by expected facial expression 214.

The term "audiovisual display," as used herein, generally refers to any type or form of media content involving images, videos, and/or sounds capable of being displayed to users on computing devices. In some examples, the content within an audiovisual display may be gathered from third-party sources and/or previously-generated media, such as clips of movies or television shows, photographs, advertisements, cartoon strips, songs, jingles, and/or combinations of one or more of the same. In other examples, an audiovisual display may be created specifically for the human-verification procedures described herein. Notably, audiovisual displays may be designed to and/or selected for their ability to produce standard and/or strong reactions in human users.

The terms "reaction" and "human reaction," as used herein, generally refer to any type or form of emotional and/or physiological response exhibited by an individual. In some examples, monitoring module 108 may attempt to produce a certain reaction from human users by presenting an audiovisual display that exhibits or embodies a corresponding theme or subject. For example, monitoring module 108 may present clips from a horror film to produce a reaction of fear or disgust in human users. In another example, monitoring module 108 may present a series of uplifting or cute images (e.g., pictures of baby animals) to produce a reaction of happiness in human users.

In some examples, a human reaction may be characterized by one or more human facial expressions. The term "facial expression," as used herein, generally refers to any motion, position, or placement of one or more features of an individual's face. Because particular facial expressions generally correspond to particular humans reactions or emotions (e.g., a smile may indicate happiness and widened eyes may indicate surprise), an audiovisual display designed to produce certain human reactions may produce certain facial expressions in all or most human users. As such, monitoring module 108 may associate an audiovisual display with one or more expected facial expressions that are likely to be produced by most human users in response to the audiovisual display.

In particular, monitoring module 108 may identify one or more expected microexpressions for an audiovisual display. The term "microexpression," as used herein, generally refers to any brief and generally involuntary facial expression. In some examples, microexpressions may be characterized by small movements of facial muscles that may not be readily apparent to other humans. For example, a microexpression may only last between $1/15$ and $1/25$ of a second. In addition, microexpressions may generally be difficult to override or mask (as opposed to a "macroexpression," such as a smile or frown, which may be more easily faked). Due to the instinctive nature of microexpressions, monitoring module 108 may identify expected microexpressions for an audiovisual display in order to capture a genuine human response to the display.

Monitoring module 108 may identify expected facial expressions for audiovisual displays in a variety of ways. In some examples, monitoring module 108 may generate a model of expected facial expressions for an audiovisual display based on actual facial expressions of human users while the users experience the audiovisual display. For example, monitoring module 108 may record the facial expressions of a group of test users and then compile the recorded facial expressions into a facial expression that represents the reaction of a typical user. Specifically, monitoring module 108 may generate a model of representative facial expressions by normalizing or averaging recordings of one or more users within the group of test users.

Furthermore, a group of test users involved in generating such models may contain any number of individuals in a variety of situations or contexts. For example, an administrator may obtain the reactions of multiple users to an audiovisual display by recording the facial expressions of a dedicated group of supervised users that are exposed to the audiovisual display. Additionally or alternatively, monitoring module 108 may crowdsource reactions from multiple users by recording the facial expressions of the users while the users are presented with an audiovisual display on various websites or online platforms (i.e., not as part of any human-verification procedure).

Once a model of expected facial expressions has been generated for an audiovisual display, the audiovisual display may be presented on a computing device in response to detecting an attempt on the computing device to access a protected computing resource. Display module 106 may present an audiovisual display on the screen and/or through the speakers of a computing device in any suitable manner such that any user currently operating and/or in the vicinity of the computing device may experience the audiovisual display. For example, display module 106 may render, stream, play, or otherwise present the audiovisual display within the webpage or other computing platform used to attempt to access the computing resource. Furthermore, display module 106 may adjust any relevant settings of a computing device (e.g., volume and/or screen brightness settings) in order to ensure that an audiovisual display is correctly and optimally presented to any users viewing the audiovisual display.

Returning to FIG. 3, at step 306 one or more of the systems described herein may monitor, while the audiovisual display is being presented, facial expressions of any user that is currently using the computing device. For example, while audiovisual display 210 is being presented, monitoring module 108 may, as part of computing device 202, monitor facial expressions of any user that is currently using computing device 202 to generate monitored facial expressions 212.

Monitoring module 108 may monitor facial expressions of users currently being presented with an audiovisual display in a variety of ways. In some examples, monitoring module 108 may identify and/or capture any and/or all facial expressions of any user that may currently be using the computing device on which an audiovisual display is being presented. For example, monitoring module 108 may trigger a webcam or other recording tool within the computing device to record all activity in a region in front of the computing device (e.g., any area visible to the webcam) while the audiovisual display is being presented. As such, in the event that a human user is currently controlling the computing device, monitoring module 108 may capture all of the facial expressions exhibited by the human user. In the event that no human user is currently controlling the computing device, monitoring module 108 may simply record whatever objects are visible to the webcam. Alternatively, monitoring module 108 may trigger a webcam to begin recording and/or monitoring activity around a computing device in response to detecting movement or facial features indicative of a human user.

Returning to FIG. 3, at step 308 one or more of the systems described herein may determine whether the attempt to access the computing resource was performed by a human user or an automated bot based at least in part on a comparison between the monitored facial expressions and the expected facial expression. For example, determination module 110 may, as part of computing device 202 in FIG. 2, determine whether the attempt to access computing resource 208 was performed by a human user or an automated bot based at least in part on a comparison between monitored facial expressions 212 and expected facial expression 214.

Determination module 110 may compare monitored facial expressions with expected facial expressions in a variety of ways. In some examples, determination module 110 may receive, from monitoring module 108, a video stream of facial expressions captured while an audiovisual display was presented on a computing device. Determination module 110 may receive such a video stream in real-time (i.e., while the audiovisual display is being presented) or after the audiovisual display has completed (e.g., as a recording of the video stream). In some examples, determination module 110 may normalize or process the video stream in the same or in a similar manner as was used to generate a model of expected facial expressions for the audiovisual display.

After receiving and/or processing a video of monitored facial expressions, determination module 110 may compare the video with a model of expected facial expressions. In some examples, determination module 110 may compute an overall degree of similarity or closeness between a video and a model (e.g., using a distance measurement applied to both the spatial and temporal aspects of the video and the model). Additionally or alternatively, determination module 110 may identify distinct facial expressions occurring at specific times during a model of expected facial expressions and determine how many of these distinct facial expressions are exhibited in a video of monitored facial expressions. Determination module 110 may perform any additional or alternative analysis to detect similarities or discrepancies between monitored facial expressions and expected facial expressions.

Based on the results of a comparison between a video of monitored facial expressions and a model of expected facial expressions, determination module 110 may determine whether the entity that exhibited the monitored facial expressions was an automated bot or a human user. For example, determination module 110 may determine that a video of monitored facial expressions that exhibits above a certain degree of similarity to a model of expected facial expressions is indicative of a human user. Conversely, determination module 110 may determine that any video of monitored facial expressions that does not meet the degree of similarity is indicative of an automated bot and/or does not conclusively verify whether a human user is currently controlling a computing device. Notably, due to variance in human reactions and/or error in video processing techniques, determination module 110 may not require that a video of monitored facial expressions exactly matches a model of expected facial reactions to determine that a human user produced the monitored facial expressions.

The systems described herein may perform one or more security actions in response to determining whether an attempt to access a protected computing resource was performed by a human user or an automated bot. For example, in the event that determination module 110 determines that an attempt was performed by a human user, security module 112 may allow the attempt. Specifically, security module 112 may direct a server or webpage that hosts the computing resource to allow the computing device on which the attempt was performed to access the computing resource.

In the event that determination module 110 determines that an attempt to access a protected computing resource was performed by an automated bot, security module 112 may perform one or more actions to prevent the automated bot from accessing the computing resource. For example, security module 112 may block, deny, or terminate the attempt to access the computing resource. Additionally or alternatively, security module 112 may notify an administrator of the computing resource about the illegitimate attempt to access the computing resource.

Furthermore, in the event that determination module 110 did not conclusively verify whether a human user is controlling a computing device based on analyzing reactions to an audiovisual display presented on the computing device, security module 112 may provide an additional chance to successfully complete a human-verification procedure. For example, security module 112 may present an additional audiovisual display and repeat the process of analyzing user reactions to the audiovisual display. In another example, security module 112 may present an alternative type of human-verification procedure (e.g., a traditional CAPTCHA or similar task).

As explained above in connection with FIG. 3, a computing device may detect an attempt to access a computing resource that is to be protected from being accessed by automated bots. In response to the request, the computing device may present, on the computing device, an audiovisual display that is designed to produce at least one expected reaction in human users (e.g., an expected emotion and corresponding facial expression). While the audiovisual display is being presented, the computing device may record (e.g., via a webcam within the computing device) facial expressions of any user that may currently be using the device. The computing device may then compare the recorded facial expressions with the facial expression that the audiovisual display is expected to produce in human users. Based on the comparison, the computing device may determine whether the attempt to access the computing device was performed by a human user or an automated bot and then block or allow the attempt accordingly.

Figure 4:
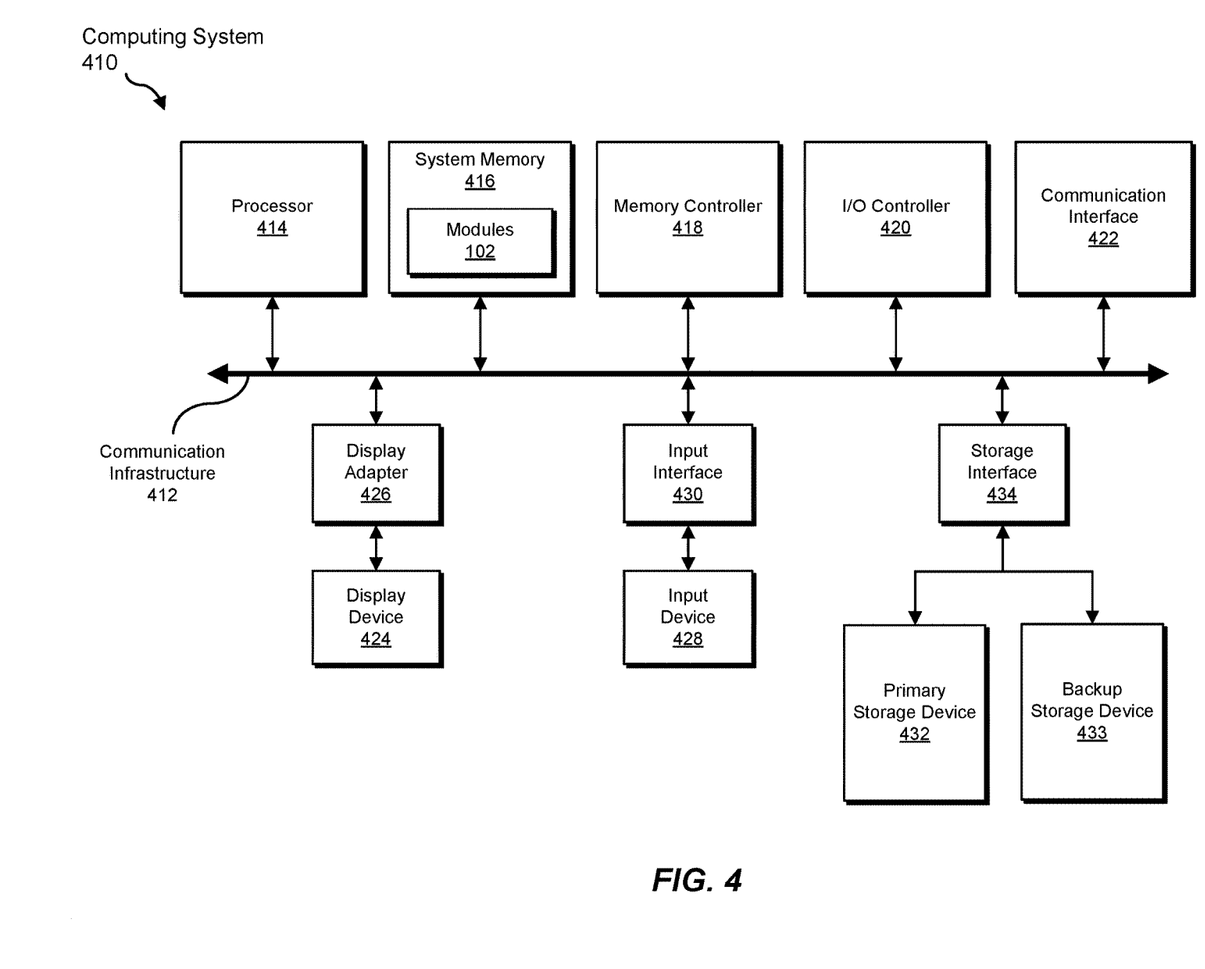
FIG. 4 is a block diagram of an exemplary computing system capable of implementing one or more of the embodiments described and/or illustrated herein.

FIG. 4 is a block diagram of an exemplary computing system 410 capable of implementing one or more of the embodiments described and/or illustrated herein. For example, all or a portion of computing system 410 may perform and/or be a means for performing, either alone or in combination with other elements, one or more of the steps described herein (such as one or more of the steps illustrated in FIG. 3). All or a portion of computing system 410 may also perform and/or be a means for performing any other steps, methods, or processes described and/or illustrated herein.

Computing system 410 broadly represents any single or multi-processor computing device or system capable of executing computer-readable instructions. Examples of computing system 410 include, without limitation, workstations, laptops, client-side terminals, servers, distributed computing systems, handheld devices, or any other computing system or device. In its most basic configuration, computing system 410 may include at least one processor 414 and a system memory 416.

Processor 414 generally represents any type or form of physical processing unit (e.g., a hardware-implemented central processing unit) capable of processing data or interpreting and executing instructions. In certain embodiments, processor 414 may receive instructions from a software application or module. These instructions may cause processor 414 to perform the functions of one or more of the exemplary embodiments described and/or illustrated herein.

System memory 416 generally represents any type or form of volatile or non-volatile storage device or medium capable of storing data and/or other computer-readable instructions. Examples of system memory 416 include, without limitation, Random Access Memory (RAM), Read Only Memory (ROM), flash memory, or any other suitable memory device. Although not required, in certain embodiments computing system 410 may include both a volatile memory unit (such as, for example, system memory 416) and a non-volatile storage device (such as, for example, primary storage device 432, as described in detail below). In one example, one or more of modules 102 from FIG. 1 may be loaded into system memory 416.

In certain embodiments, exemplary computing system 410 may also include one or more components or elements in addition to processor 414 and system memory 416. For example, as illustrated in FIG. 4, computing system 410 may include a memory controller 418, an Input/Output (I/O) controller 420, and a communication interface 422, each of which may be interconnected via a communication infrastructure 412. Communication infrastructure 412 generally represents any type or form of infrastructure capable of facilitating communication between one or more components of a computing device. Examples of communication infrastructure 412 include, without limitation, a communication bus (such as an Industry Standard Architecture (ISA), Peripheral Component Interconnect (PCI), PCI Express (PCIe), or similar bus) and a network.

Memory controller 418 generally represents any type or form of device capable of handling memory or data or controlling communication between one or more components of computing system 410. For example, in certain embodiments memory controller 418 may control communication between processor 414, system memory 416, and I/O controller 420 via communication infrastructure 412.

I/O controller 420 generally represents any type or form of module capable of coordinating and/or controlling the input and output functions of a computing device. For example, in certain embodiments I/O controller 420 may control or facilitate transfer of data between one or more elements of computing system 410, such as processor 414, system memory 416, communication interface 422, display adapter 426, input interface 430, and storage interface 434.

Communication interface 422 broadly represents any type or form of communication device or adapter capable of facilitating communication between exemplary computing system 410 and one or more additional devices. For example, in certain embodiments communication interface 422 may facilitate communication between computing system 410 and a private or public network including additional computing systems. Examples of communication interface 422 include, without limitation, a wired network interface (such as a network interface card), a wireless network interface (such as a wireless network interface card), a modem, and any other suitable interface. In at least one embodiment, communication interface 422 may provide a direct connection to a remote server via a direct link to a network, such as the Internet. Communication interface 422 may also indirectly provide such a connection through, for example, a local area network (such as an Ethernet network), a personal area network, a telephone or cable network, a cellular telephone connection, a satellite data connection, or any other suitable connection.

In certain embodiments, communication interface 422 may also represent a host adapter configured to facilitate communication between computing system 410 and one or more additional network or storage devices via an external bus or communications channel. Examples of host adapters include, without limitation, Small Computer System Interface (SCSI) host adapters, Universal Serial Bus (USB) host adapters, Institute of Electrical and Electronics Engineers (IEEE) 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. Communication interface 422 may also allow computing system 410 to engage in distributed or remote computing. For example, communication interface 422 may receive instructions from a remote device or send instructions to a remote device for execution.

As illustrated in FIG. 4, computing system 410 may also include at least one display device 424 coupled to communication infrastructure 412 via a display adapter 426. Display device 424 generally represents any type or form of device capable of visually displaying information forwarded by display adapter 426. Similarly, display adapter 426 generally represents any type or form of device configured to forward graphics, text, and other data from communication infrastructure 412 (or from a frame buffer, as known in the art) for display on display device 424.

As illustrated in FIG. 4, exemplary computing system 410 may also include at least one input device 428 coupled to communication infrastructure 412 via an input interface 430. Input device 428 generally represents any type or form of input device capable of providing input, either computer or human generated, to exemplary computing system 410. Examples of input device 428 include, without limitation, a keyboard, a pointing device, a speech recognition device, or any other input device.

As illustrated in FIG. 4, exemplary computing system 410 may also include a primary storage device 432 and a backup storage device 433 coupled to communication infrastructure 412 via a storage interface 434. Storage devices 432 and 433 generally represent any type or form of storage device or medium capable of storing data and/or other computer-readable instructions. For example, storage devices 432 and 433 may be a magnetic disk drive (e.g., a so-called hard drive), a solid state drive, a floppy disk drive, a magnetic tape drive, an optical disk drive, a flash drive, or the like. Storage interface 434 generally represents any type or form of interface or device for transferring data between storage devices 432 and 433 and other components of computing system 410.

In certain embodiments, storage devices 432 and 433 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 432 and 433 may also include other similar structures or devices for allowing computer software, data, or other computer-readable instructions to be loaded into computing system 410. For example, storage devices 432 and 433 may be configured to read and write software, data, or other computer-readable information. Storage devices 432 and 433 may also be a part of computing system 410 or may be a separate device accessed through other interface systems.

Many other devices or subsystems may be connected to computing system 410. Conversely, all of the components and devices illustrated in FIG. 4 need not be present to practice the embodiments described and/or illustrated herein. The devices and subsystems referenced above may also be interconnected in different ways from that shown in FIG. 4. Computing system 410 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable medium. The term "computer-readable medium," as used herein, generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The computer-readable medium containing the computer program may be loaded into computing system 410. All or a portion of the computer program stored on the computer-readable medium may then be stored in system memory 416 and/or various portions of storage devices 432 and 433. When executed by processor 414, a computer program loaded into computing system 410 may cause processor 414 to perform and/or be a means for performing the functions of one or more of the exemplary embodiments described and/or illustrated herein. Additionally or alternatively, one or more of the exemplary embodiments described and/or illustrated herein may be implemented in firmware and/or hardware. For example, computing system 410 may be configured as an Application Specific Integrated Circuit (ASIC) adapted to implement one or more of the exemplary embodiments disclosed herein.

Figure 5:
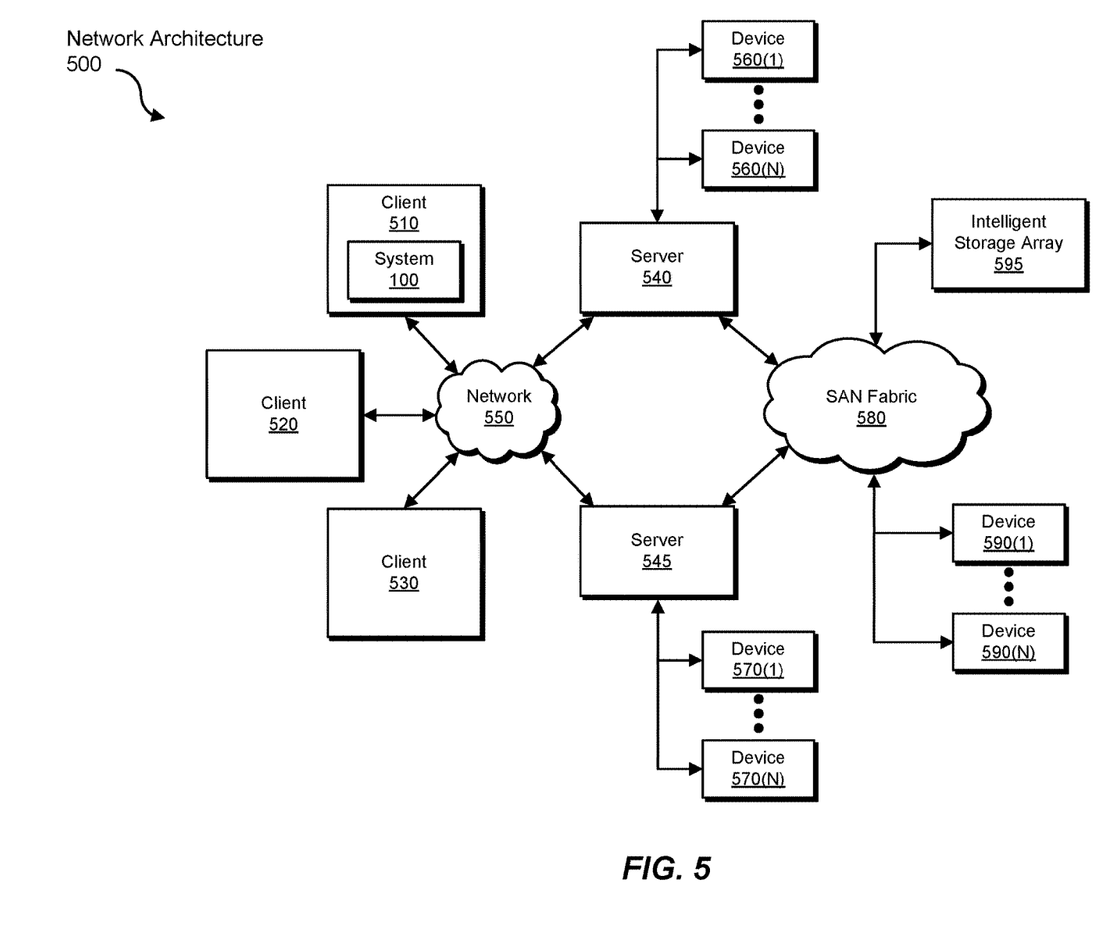
FIG. 5 is a block diagram of an exemplary computing network capable of implementing one or more of the embodiments described and/or illustrated herein.

FIG. 5 is a block diagram of an exemplary network architecture 500 in which client systems 510, 520, and 530 and servers 540 and 545 may be coupled to a network 550. As detailed above, all or a portion of network architecture 500 may perform and/or be a means for performing, either alone or in combination with other elements, one or more of the steps disclosed herein (such as one or more of the steps illustrated in FIG. 3). All or a portion of network architecture 500 may also be used to perform and/or be a means for performing other steps and features set forth in the instant disclosure.

Client systems 510, 520, and 530 generally represent any type or form of computing device or system, such as exemplary computing system 410 in FIG. 4. Similarly, servers 540 and 545 generally represent computing devices or systems, such as application servers or database servers, configured to provide various database services and/or run certain software applications. Network 550 generally represents any telecommunication or computer network including, for example, an intranet, a WAN, a LAN, a PAN, or the Internet. In one example, client systems 510, 520, and/or 530 and/or servers 540 and/or 545 may include all or a portion of system 100 from FIG. 1.

As illustrated in FIG. 5, one or more storage devices 560(1)-(N) may be directly attached to server 540. Similarly, one or more storage devices 570(1)-(N) may be directly attached to server 545. Storage devices 560(1)-(N) and storage devices 570(1)-(N) generally represent any type or form of storage device or medium capable of storing data and/or other computer-readable instructions. In certain embodiments, storage devices 560(1)-(N) and storage devices 570(1)-(N) may represent Network-Attached Storage (NAS) devices configured to communicate with servers 540 and 545 using various protocols, such as Network File System (NFS), Server Message Block (SMB), or Common Internet File System (CIFS).

Servers 540 and 545 may also be connected to a Storage Area Network (SAN) fabric 580. SAN fabric 580 generally represents any type or form of computer network or architecture capable of facilitating communication between a plurality of storage devices. SAN fabric 580 may facilitate communication between servers 540 and 545 and a plurality of storage devices 590(1)-(N) and/or an intelligent storage array 595. SAN fabric 580 may also facilitate, via network 550 and servers 540 and 545, communication between client systems 510, 520, and 530 and storage devices 590(1)-(N) and/or intelligent storage array 595 in such a manner that devices 590(1)-(N) and array 595 appear as locally attached devices to client systems 510, 520, and 530. As with storage devices 560(1)-(N) and storage devices 570(1)-(N), storage devices 590(1)-(N) and intelligent storage array 595 generally represent any type or form of storage device or medium capable of storing data and/or other computer-readable instructions.

In certain embodiments, and with reference to exemplary computing system 410 of FIG. 4, a communication interface, such as communication interface 422 in FIG. 4, may be used to provide connectivity between each client system 510, 520, and 530 and network 550. Client systems 510, 520, and 530 may be able to access information on server 540 or 545 using, for example, a web browser or other client software. Such software may allow client systems 510, 520, and 530 to access data hosted by server 540, server 545, storage devices 560(1)-(N), storage devices 570(1)-(N), storage devices 590(1)-(N), or intelligent storage array 595. Although FIG. 5 depicts the use of a network (such as the Internet) for exchanging data, the embodiments described and/or illustrated herein are not limited to the Internet or any particular network-based environment.

In at least one embodiment, all or a portion of one or more of the exemplary embodiments disclosed herein may be encoded as a computer program and loaded onto and executed by server 540, server 545, storage devices 560(1)-(N), storage devices 570(1)-(N), storage devices 590(1)-(N), intelligent storage array 595, or any combination thereof. All or a portion of one or more of the exemplary embodiments disclosed herein may also be encoded as a computer program, stored in server 540, run by server 545, and distributed to client systems 510, 520, and 530 over network 550.

As detailed above, computing system 410 and/or one or more components of network architecture 500 may perform and/or be a means for performing, either alone or in combination with other elements, one or more steps of an exemplary method for performing human-verification procedures.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

In some examples, all or a portion of exemplary system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In various embodiments, all or a portion of exemplary system 100 in FIG. 1 may facilitate multi-tenancy within a cloud-based computing environment. In other words, the software modules described herein may configure a computing system (e.g., a server) to facilitate multi-tenancy for one or more of the functions described herein. For example, one or more of the software modules described herein may program a server to enable two or more clients (e.g., customers) to share an application that is running on the server. A server programmed in this manner may share an application, operating system, processing system, and/or storage system among multiple customers (i.e., tenants). One or more of the modules described herein may also partition data and/or configuration information of a multi-tenant application for each customer such that one customer cannot access data and/or configuration information of another customer.

According to various embodiments, all or a portion of exemplary system 100 in FIG. 1 may be implemented within a virtual environment. For example, the modules and/or data described herein may reside and/or execute within a virtual machine. As used herein, the term "virtual machine" generally refers to any operating system environment that is abstracted from computing hardware by a virtual machine manager (e.g., a hypervisor). Additionally or alternatively, the modules and/or data described herein may reside and/or execute within a virtualization layer. As used herein, the term "virtualization layer" generally refers to any data layer and/or application layer that overlays and/or is abstracted from an operating system environment. A virtualization layer may be managed by a software virtualization solution (e.g., a file system filter) that presents the virtualization layer as though it were part of an underlying base operating system. For example, a software virtualization solution may redirect calls that are initially directed to locations within a base file system and/or registry to locations within a virtualization layer.

In some examples, all or a portion of exemplary system 100 in FIG. 1 may represent portions of a mobile computing environment. Mobile computing environments may be implemented by a wide range of mobile computing devices, including mobile phones, tablet computers, e-book readers, personal digital assistants, wearable computing devices (e.g., computing devices with a head-mounted display, smartwatches, etc.), and the like. In some examples, mobile computing environments may have one or more distinct features, including, for example, reliance on battery power, presenting only one foreground application at any given time, remote management features, touchscreen features, location and movement data (e.g., provided by Global Positioning Systems, gyroscopes, accelerometers, etc.), restricted platforms that restrict modifications to system-level configurations and/or that limit the ability of third-party software to inspect the behavior of other applications, controls to restrict the installation of applications (e.g., to only originate from approved application stores), etc. Various functions described herein may be provided for a mobile computing environment and/or may interact with a mobile computing environment.

In addition, all or a portion of exemplary system 100 in FIG. 1 may represent portions of, interact with, consume data produced by, and/or produce data consumed by one or more systems for information management. As used herein, the term "information management" may refer to the protection, organization, and/or storage of data. Examples of systems for information management may include, without limitation, storage systems, backup systems, archival systems, replication systems, high availability systems, data search systems, virtualization systems, and the like.

In some embodiments, all or a portion of exemplary system 100 in FIG. 1 may represent portions of, produce data protected by, and/or communicate with one or more systems for information security. As used herein, the term "information security" may refer to the control of access to protected data. Examples of systems for information security may include, without limitation, systems providing managed security services, data loss prevention systems, identity authentication systems, access control systems, encryption systems, policy compliance systems, intrusion detection and prevention systems, electronic discovery systems, and the like.

According to some examples, all or a portion of exemplary system 100 in FIG. 1 may represent portions of, communicate with, and/or receive protection from one or more systems for endpoint security. As used herein, the term "endpoint security" may refer to the protection of endpoint systems from unauthorized and/or illegitimate use, access, and/or control. Examples of systems for endpoint protection may include, without limitation, anti-malware systems, user authentication systems, encryption systems, privacy systems, spam-filtering services, and the like.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

While various embodiments have been described and/or illustrated herein in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

In addition, one or more of the modules described herein may transform data, physical devices, and/or representations of physical devices from one form to another. For example, one or more of the modules recited herein may receive monitored facial expressions of users to be transformed, transform the monitored facial expressions into a determination of whether the users are human users or automated bots, output a result of the transformation to a computing resource that is to be protected from being accessed by automated bots, use the result of the transformation to prevent automated bots from accessing the computing resource, and store the result of the transformation in a server or database. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method for performing human-verification procedures, at least a portion of the method being performed by a computing device comprising at least one processor, the method comprising:
   identifying at least one genuine human emotion expected to be experienced by human users in response to interacting with a portion of media content;
   generating a model of an expected microexpression that represents an involuntary movement of facial muscles indicative of the genuine human emotion by:
      incorporating the portion of media content into an audiovisual display;
      while presenting the audiovisual display to a group of test users, recording microexpressions of the group of test users at a specific time within the audiovisual display at which the group of test users interacts with the portion of media content; and
      averaging the recorded microexpressions of the group of test users;
   detecting, at the computing device, an attempt to access a computing resource that is to be protected from being accessed by automated bots;
   in response to detecting the attempt to access the computing resource, presenting the audiovisual display on the computing device by:
      identifying an audiovisual system of the computing device that is to present the audiovisual display;
      optimizing the presentation of the audiovisual display by adjusting at least one setting of the audiovisual system; and
      directing the audiovisual system to present the audiovisual display;
   while the audiovisual display is being presented, monitoring, at the specific time within the audiovisual display, a microexpression of any user that is currently using the computing device; and
   determining whether the attempt to access the computing resource was performed by a human user or an automated bot based at least in part on whether the monitored microexpression matches the expected microexpression.

2. The method of claim 1, wherein the computing resource comprises at least one of:
   a user account;
   a database that stores sensitive information; and
   an online platform capable of facilitating financial transactions.

3. The method of claim 1, wherein the portion of media content comprises at least one of:
   a series of images; and
   a video clip.

4. The method of claim 1, wherein:
   the expected microexpression comprises a series of microexpressions that characterizes a series of human emotions; and
   the specific time within the audiovisual display comprises a corresponding series of specific times.

5. The method of claim 1, wherein generating the model of the expected microexpression comprises crowdsourcing the microexpressions of the group of test users by presenting the audiovisual display to the group of test users on an online platform that does not provide human-verification procedures.

6. The method of claim 1, wherein monitoring the microexpression of any user that is currently using the computing device comprises triggering a webcam built into the computing device to record activity occurring around the computing device.

7. The method of claim 1, wherein determining whether the attempt to access the computing resource was performed by the human user or the automated bot comprises determining that the attempt was performed by the automated bot based on determining that the monitored microexpression does not match the model of the expected microexpression.

8. The method of claim 7, further comprising, in response to determining that the attempt was performed by the automated bot, performing at least one of:
   presenting an additional human-verification procedure on the computing device; and
   preventing the computing device from accessing the computing resource.

9. The method of claim 7, wherein determining that the attempt to access the computing resource was performed by the automated bot comprises determining that the attempt was performed as part of a Denial of Service (DoS) attack involving a plurality of automated bots that each attempted to access the computing resource to render the computing resource unavailable to intended users.

10. The method of claim 1, wherein determining whether the attempt to access the computing resource was performed by the human user or the automated bot comprises determining that the attempt was performed by the human user based on determining that the monitored microexpression matches the model of the expected microexpression.

11. The method of claim 10, further comprising allowing the computing device to access the computing resource in response to determining that the attempt was performed by the human user.

12. The method of claim 1, further comprising designing the portion of media content to produce the genuine human emotion in human users.

13. A system for performing human-verification procedures, the system comprising:
   a detection module, stored in memory, that detects, at a computing device, an attempt to access a computing resource that is to be protected from being accessed by automated bots;
   a display module, stored in memory, that:

incorporates a portion of media content into an audiovisual display; and in response to the attempt to access the computing resource, presents the audiovisual display on the computing device by:
identifying an audiovisual system of the computing device that is to present the audiovisual display;
optimizing the presentation of the audiovisual display by adjusting at least one setting of the audiovisual system; and
directing the audiovisual system to present the audiovisual display;

a monitoring module, stored in memory, that:
identifies at least one genuine human emotion expected to be experienced by human users in response to interacting with the portion of media content;
generates a model of an expected microexpression that represents an involuntary movement of facial muscles indicative of the genuine human emotion by:
while presenting the audiovisual display to a group of test users, recording microexpressions of the group of test users at a specific time within the audiovisual display at which the group of test users interacts with the portion of media content; and
averaging the recorded microexpressions of the group of test users; and
monitors, at the specific time within the audiovisual display while the audiovisual display is being presented, a microexpression of any user that is currently using the computing device;

a determination module, stored in memory, that determines whether the attempt to access the computing resource was performed by a human user or an automated bot based at least in part on whether the monitored microexpression matches the expected microexpression; and at least one hardware processor configured to execute the detection module, the display module, the monitoring module, and the determination module.

14. The system of claim 13, wherein the computing resource comprises at least one of:
a user account;
a database that stores sensitive information; and
an online platform capable of facilitating financial transactions.

15. The system of claim 13, wherein the portion of media content comprises at least one of:
a series of images; and
a video clip.

16. The system of claim 13, wherein:
the expected microexpression comprises a series of microexpressions that characterizes a series of human emotions; and
the specific time during the audiovisual display comprises a corresponding series of specific times.

17. The system of claim 13, wherein the monitoring module crowdsources the microexpressions of the group of test users by presenting the audiovisual display to the group of test users on an online platform that does not provide human-verification procedures.

18. The system of claim 13, wherein the monitoring module monitors the microexpression of any user that is currently using the computing device by triggering a webcam built into the computing device to record activity occurring around the computing device.

19. The system of claim 13, wherein the determination module determines whether the attempt to access the computing resource was performed by the human user or the automated bot by determining that the attempt was performed by the automated bot based on determining that the monitored microexpression does not match the model of the expected microexpression.

20. A non-transitory computer-readable medium comprising one or more computer-readable instructions that, when executed by at least one processor of a computing device, cause the computing device to:
identify at least one genuine human emotion expected to be experienced by human users in response to interacting with a portion of media content;
generate a model of an expected microexpression that represents an involuntary movement of facial muscles indicative of the genuine human emotion by:
incorporating the portion of media content into an audiovisual display;
while presenting the audiovisual display to a group of test users, recording microexpressions of the group of test users at a specific time within the audiovisual display at which the group of test users interacts with the portion of media content; and
averaging the recorded microexpressions of the group of test users;
detect, at the computing device, an attempt to access a computing resource that is to be protected from being accessed by automated bots;
in response to detecting the attempt to access the computing resource, present the audiovisual display on the computing device by:
identifying an audiovisual system of the computing device that is to present the audiovisual display;
optimizing the presentation of the audiovisual display by adjusting at least one setting of the audiovisual system; and
directing the audiovisual system to present the audiovisual display;
while the audiovisual display is being presented, monitor, at the specific time within the audiovisual display, a microexpression of any user that is currently using the computing device; and
determine whether the attempt to access the computing resource was performed by a human user or an automated bot based at least in part on whether the monitored microexpression matches the expected microexpression.

* * * * *